(12) United States Patent
Mihara

(10) Patent No.: US 10,626,947 B2
(45) Date of Patent: Apr. 21, 2020

(54) FLUID DAMPER DEVICE AND APPARATUS WITH DAMPER

(71) Applicant: NIDEC SANKYO CORPORATION, Nagano (JP)

(72) Inventor: Naoya Mihara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 116 days.

(21) Appl. No.: 15/976,877

(22) Filed: May 11, 2018

(65) Prior Publication Data
US 2018/0328439 A1 Nov. 15, 2018

(30) Foreign Application Priority Data

May 12, 2017 (JP) ................................. 2017-095877
May 12, 2017 (JP) ................................. 2017-095878

(51) Int. Cl.
| | | |
|---|---|---|
| *F16F 9/14* | (2006.01) | |
| *E05D 11/00* | (2006.01) | |
| *E05D 3/02* | (2006.01) | |
| *F16F 9/36* | (2006.01) | |
| *A47K 13/12* | (2006.01) | |
| *E05F 5/00* | (2017.01) | |
| *E05D 11/06* | (2006.01) | |
| *F16F 9/34* | (2006.01) | |

(52) U.S. Cl.
CPC .............. *F16F 9/145* (2013.01); *A47K 13/12* (2013.01); *E05D 3/02* (2013.01); *E05D 11/00* (2013.01); *E05F 5/00* (2013.01); *F16F 9/369* (2013.01); *E05D 11/06* (2013.01); *E05Y 2201/212* (2013.01); *E05Y 2201/224* (2013.01); *E05Y 2201/266* (2013.01); *E05Y 2900/614* (2013.01); *F16F 9/34* (2013.01); *F16F 2222/12* (2013.01); *F16F 2232/02* (2013.01)

(58) Field of Classification Search
CPC ....................................................... A47K 13/12
USPC ............................................................. 4/240
See application file for complete search history.

(56) References Cited

U.S. PATENT DOCUMENTS

2017/0314311 A1* 11/2017 Mihara .................. A47K 13/12

FOREIGN PATENT DOCUMENTS

| JP | 2016-088745 | * 4/2016 | ................ E05F 5/02 |
| JP | 2016223538 | 12/2016 | |

* cited by examiner

*Primary Examiner* — Christine J Skubinna
(74) *Attorney, Agent, or Firm* — JCIPRNET

(57) ABSTRACT

The fluid damper device includes a rotor inserted into a case, and a cover fixed to an opening portion of the case. A thin portion is formed at an end portion of the case on one side in an axis direction, and a contact portion which is in contact with a small-diameter portion of the cover in the axis direction is formed at four positions of an inner circumferential surface of the thin portion at equal angular intervals. A partitioning convex portion which partitions a damper chamber in a circumferential direction is formed on an inner circumferential surface of the case, and the contact portions are formed at positions corresponding to the partitioning convex portion in the circumferential direction. A concave portion recessed radially outward is formed at a position different from the contact portion in the circumferential direction, and a welding convex portion is formed in the concave portion.

25 Claims, 9 Drawing Sheets

FLUID DAMPER DEVICE AND APPARATUS WITH DAMPER

CROSS REFERENCE TO RELATED APPLICATION

The present invention claims priority under 35 U.S.C. § 119 to Japanese Application No. 2017-095877 filed May 12, 2017, and Japanese Application No. 2017-095878 filed May 12, 2017, and the entire content of which is incorporated herein by reference.

BACKGROUND

Technical Field

The disclosure relates to a fluid damper device in which a fluid is filled between a case and a rotor, and an apparatus with a damper.

Description of Related Art

Patent Document 1 (Japanese Patent Laid-open No. 2016-223538) discloses a fluid damper device in which a fluid such as oil is filled between a bottomed cylindrical case and a rotor. In the fluid damper device of Patent Document 1, one end of the rotor (rotating shaft) in an axial direction is disposed inside the case, a damper chamber is formed between the rotating shaft and an inner circumferential surface of the case, and a valve body provided on a side surface of the rotating shaft is disposed in the damper chamber. When the rotor rotates in a first direction, a radial distal end of the valve body and the inner circumferential surface of the case are in contact with each other. Therefore, a rotational load of the rotor is large. On the other hand, when the rotor rotates in a direction opposite to the first direction, a gap is formed between the valve body and the inner circumferential surface of the case due to resistance of the fluid, and the fluid passes through this gap, and thus the rotational load of the rotor is small.

Patent Document 1: Japanese Patent Laid-Open No. 2016-223538

In the fluid damper device of Patent Document 1, the rotor is prevented from being separated from the case due to a cover fixed to an opening portion of the case. As a fixing method of the cover, a screw-type fixing method in which a female screw formed on the inner circumferential surface of the case and a male screw formed on an outer circumferential surface of the cover are screwed is used. However, since the screw type has a large dimension in the axial direction, the cost of a mold for forming a threaded portion is high. Therefore, in order to reduce a thickness in the axial direction and to reduce the cost, fixation by welding is performed. When the cover is fixed to the case by welding, the inner circumferential surface of the case and an end of the cover inserted into the case are melted, and the cover is pushed into the case.

When the fixation is performed by welding, in order to make a pushing amount of the cover into the case appropriate, a stepped portion is formed on the inner circumferential surface of the case, and the cover is brought into contact with the stepped portion. However, even when the stepped portion is formed on the case, a portion in which the stepped portion and the cover are in contact with each other may be deformed by an influence of welding, and the pushing amount of the cover into the case may vary. For example, when ultrasonic welding is performed, a horn which generates ultrasonic waves is applied to melt a welding portion, but when there is variation in a welding height due to the horn, the stepped portion may be deformed, and the pushing amount of the cover may vary. When the pushing amount of the cover into the case varies, axial dimensional accuracy of the damper chamber filled with the fluid decreases. As a result, a volume of the damper chamber changes, and damper performance may vary.

SUMMARY

In the embodiments of the disclosure, a cover is properly fixed in a fluid damper device.

A fluid damper device of one or some exemplary embodiments of the disclosure includes a case in a bottomed cylindrical shape and configured to be open on one side in an axis direction, a rotor having a rotating shaft and a valve body and the rotor being inserted into a damper chamber formed in the case, a fluid filled in the damper chamber, a cover having a through-hole through which the rotor passes and the cover is fixed into an opening portion of the case, and a sealing member configured to seal a gap between an outer circumferential surface of the rotor and an inner circumferential surface of the case, wherein contact portions which are in contact with the cover in the axis direction are formed in parts of an inner circumferential surface of the case in a circumferential direction.

In one or some exemplary embodiments of the disclosure, the contact portions which are in contact with the cover fixed into the opening portion of the case in the axis direction are formed on parts of the inner circumferential surface of the case of the fluid damper device in the circumferential direction. Therefore, when the cover is fixed by welding, since a welding portion and the contact portions may be provided at different positions in the circumferential direction, there is little possibility of the contact portion being deformed by the welding. Therefore, positioning of the cover in the axis direction can be performed with high accuracy, and the cover can be properly fixed. Accordingly, it is possible to improve dimensional accuracy in the axis direction of the damper chamber and to minimize variation in damper performance.

In one or some exemplary embodiments of the disclosure, partitioning convex portions configured to partition the damper chamber in the circumferential direction may be formed on the inner circumferential surface of the case, and the contact portions may be formed at circumferential positions corresponding to the partitioning convex portions. In this way, the positioning of the cover in the axis direction can be accurately performed at positions of the partitioning convex portions. Therefore, dimensional accuracy in the axis direction of the damper chamber can be improved, and the variation in the damper performance can be minimized.

In one or some exemplary embodiments of the disclosure, ribs configured to extend in a radial direction may be formed on end surface of the partitioning convex portions on one side in the axis direction, and the contact portions may be formed in ranges including angular position of the ribs. In this way, the positioning of the cover in the axis direction can be accurately performed at positions of the rib for enhancing sealing accuracy of the damper chamber. Therefore, the sealing accuracy of the damper chamber can be improved.

In one or some exemplary embodiments of the disclosure, the contact portions may be formed at two opposing positions with respect to a center of the inner circumferential surface of the case in a radial direction. For example, the contact portions are formed at the two opposing positions with respect to the center of the case in the radial direction on a straight line extending in the radial direction of the case. In this way, since the two contact portions are formed on the opposing sides with respect to the center in the radial direction, it is possible to accurately position the cover in the axis direction. Further, when the two contact portions are formed on a straight line extending in a radial direction, inclination of the cover can be minimized.

In one or some exemplary embodiments of the disclosure, the contact portion mays be formed at three positions separated in the circumferential direction, and two of the three positions may be disposed on a side opposite to the remaining one of the three positions with respect to a center of the case in a radial direction. For example, the contact portions are formed at three positions spaced at equal angular intervals with respect to the center of the inner circumferential surface of the case in the radial direction. In this way, since two of the three positions separated in the circumferential direction are formed on the side opposite to the remaining one position, the positioning of the cover in the axis direction can be accurately performed. Particularly, since the contact portions are formed evenly in the circumferential direction, the positioning of the cover in the axis direction can be performed with high accuracy, and the inclination of the cover can be minimized.

In one or some exemplary embodiments of the disclosure, the contact portions may be formed at four positions separated in the circumferential direction, two of the four positions may be two positions which are located on opposing sides with respect to a center of the case in the radial direction on a first straight line extending in the radial direction of the case and which overlaps the rib in the axis direction, and the remaining two of the four positions may be two positions located on opposing sides with respect to the center of the case in the radial direction on a second straight line extending in the radial direction of the case and intersecting the first straight line. For example, the contact portions are formed at four positions spaced at equal angular intervals with respect to the center of the case in the radial direction. In this way, the positioning of the cover in the axis direction can be performed with high accuracy. Further, the sealing accuracy of the damper chamber can be improved by positioning the cover in the axis direction at the position of the rib for enhancing the sealing accuracy of the damper chamber. Furthermore, as the contact portion is formed evenly in the circumferential direction, the positioning of the cover in the axis direction can be performed with high accuracy, and the inclination of the cover can be minimized.

In one or some exemplary embodiments of the disclosure, a welding convex portion which is welded to the cover may be formed on an inner circumferential surface of the case at a different position from the contact portions in the circumferential direction, the welding convex portion may extend in the axis direction, and one end of the welding convex portion in the axis direction, the contact portions, and the other end of the welding convex portion in the axis direction may be arranged in the axis direction in this order. As described above, when the welding convex portion and the contact portions are formed at different positions in the circumferential direction, even if a welding height is within a range including a position (a height in the axis direction) of the contact portions in the axis direction, there is little possibility of the contact portion being deformed. Therefore, the positioning of the cover in the axis direction can be performed with high accuracy.

In one or some exemplary embodiments of the disclosure, the cover may have a small-diameter portion inserted into the case, an arc-shaped inner circumferential surface centering on a rotation center of the rotor may be provided on the case at a different position from the welding convex portion in the circumferential direction, and the small-diameter portion may be positioned by the arc-shaped inner circumferential surface in a direction orthogonal to the axis direction. In this way, the cover and the case can be coaxially positioned at positions different from the welding position in the circumferential direction.

In one or some exemplary embodiments of the disclosure, an inner circumferential surface of the welding convex portion may have an arc shape centering on a rotation center of the rotor. In this way, the welding convex portion and the cover can be uniformly welded in the circumferential direction.

In one or some exemplary embodiments of the disclosure, an outflow preventing portion may be provided in at least a part of a position adjacent to the welding convex portion to be located radially inward from the inner circumferential surface of the case. For example, as the outflow preventing portion, a gap (that is, a welding burr sump) capable of holding a molten material such as a resin flowing out from the welding portion can be provided. In this way, since the molten material flowing out from the welding portion can be held in the outflow preventing portion, there is less possibility of the melted material flowing out to the outside of the case and the cover, and of welding burrs being formed, and there is less possibility of a process of removing welding burrs being added. Further, there is little possibility of the molten material flowing out toward the damper chamber side and the sealing property of the damper chamber deteriorating.

In this case, the outflow preventing portion may be provided at a position adjacent to at least the welding convex portion in the circumferential direction. Accordingly, the molten material flowing out in the circumferential direction can be held in the outflow preventing portion.

In one or some exemplary embodiments of the disclosure, the case and the cover may be welded in a predetermined range in the axis direction, and an outflow restricting portion located on the other side of the outflow preventing portion in the axis direction may be provided on the other side in the axial direction from the predetermined range. In this way, it is possible to restrict the molten material from flowing out from the outflow preventing portion to the damper chamber side.

In this case, the outflow preventing portion may be provided at a position adjacent to the welding convex portion in the circumferential direction to continue from an end portion of the case on one side in the axis direction to the outflow restricting portion. In this way, because the outflow preventing portion that is continuous in the axis direction can be provided, it is possible to prevent the molten material from flowing out to the outside of the case and the cover and to the damper chamber side.

Further, the outflow preventing portion may be provided on the other side of the predetermined range in the axis direction to be located radially inward from the inner circumferential surface of the welding convex portion. In this way, the molten material flowing out to the other side in the axis direction (damper chamber side) can be accommodated in the outflow preventing portion on an inner side in the radial direction.

Alternatively, the outflow restricting portion may be provided on one side in the axis direction from the sealing member. In this way, deformation of the sealing member due to the molten material which flows out to the other side in the axis direction (damper chamber side) can be prevented. Therefore, there is little possibility of the sealing property of the damper chamber deteriorating.

In one or some exemplary embodiments of the disclosure, the outflow preventing portion may be provided on one side of the predetermined range in the axis direction. In this way, there is little possibility of the molten material that flows out from the welding range (predetermined range) to one side in the axis direction (the opening side of the case) flowing to the outside of the case.

In one or some exemplary embodiments of the disclosure, a welding convex portion which is welded to the cover may be formed on a part of the inner circumferential surface of the case in the circumferential direction, the welding convex portion and the cover may be welded in a predetermined range in the axis direction, and an outflow preventing portion may be provided on one side in the axis direction from the predetermined range to be located radially inward from the inner circumferential surface of the case.

In one or some exemplary embodiments of the disclosure, the welding convex portion which is welded to the cover is formed on a part of the inner circumferential surface of the case of the fluid damper device in the circumferential direction. Additionally, at one side in the axis direction (the opening portion side of the case) with respect to a range in which the welding convex portion and the cover are welded, the outflow preventing portion is provided to be located radially inward from the inner circumferential surface of the case. For example, as the outflow preventing portion, a gap (that is, a weld burr sump) capable of holding a welding material such as a resin flowing out from the welding portion can be provided. In this way, it is possible to properly process the welding material which flows out from the welding portion. For example, since the welding material can be held in the outflow preventing portion, there is little possibility of the welding material flowing out to the outside of the case and the cover, and welding burrs being formed. Therefore, there is little possibility of the process of removing welding burrs being added.

In one or some exemplary embodiments of the disclosure, the cover may include a small-diameter portion which is inserted into the case and welded to the welding convex portion and a large-diameter portion of which a diameter is larger than that of the small-diameter portion, and the outflow preventing portion may be covered by the large-diameter portion from one side in the axis direction. In this way, since the outflow preventing portion can be made invisible from the outside by the large-diameter portion, it is possible to make the welding material held in the outflow preventing part invisible from the outside, improving its appearance. Further, even if a small amount of welding material flows out from the outflow preventing portion and welding burrs are formed, since the welding burrs are covered by the large-diameter part and cannot be seen directly, there is little possibility of the process of removing the welding burrs being added.

In one or some exemplary embodiments of the disclosure, an arc-shaped inner circumferential surface centering on a rotation center of the rotor may be provided on the case at a different position from the welding convex portion in the circumferential direction, and the small-diameter portion may be positioned by the arc-shaped inner circumferential surface in a direction orthogonal to the axis direction. In this way, the cover and the case can be coaxially positioned at positions different from the welding position in the circumferential direction.

In one or some exemplary embodiments of the disclosure, the case may include a stepped portion formed on one side of the welding convex portion in the axis direction. In this way, it is easy to secure a space of the outflow preventing portion between the stepped portion and the cover. Further, in this case, the welding convex portion may include a tapered surface connected to an inner circumferential edge of the stepped portion, and the tapered surface may be inclined in a direction expanding radially outward as it goes toward one side in the axis direction. In this way, since an edge of a distal end surface of the cover can be brought into contact with the tapered surface of the welding convex portion in the axis direction, it is possible to form a contact state suitable for ultrasonic welding.

Next, the embodiments of the disclosure provide an apparatus with a damper including the fluid damper device, wherein an opening and closing member configured to rotate and move with respect to an apparatus body is installed on the rotating shaft. For example, the opening and closing member is a toilet seat of a western type toilet bowl. As described above, when the opening and closing member such as a toilet seat is installed on the rotating shaft of the fluid damper device, a rotational load of the opening and closing member can be increased. Therefore, sudden movement of the opening and closing member can be minimized.

In one or some exemplary embodiments of the disclosure, the contact portions which are in contact with the cover fixed into the opening portion of the case in the axis direction are formed on parts of the inner circumferential surface of the case of the fluid damper device in the circumferential direction. Therefore, when the cover is fixed by welding, since a welding portion and the contact portions may be provided at different positions in the circumferential direction, there is little possibility of the contact portion being deformed by the welding. Therefore, positioning of the cover in the axis direction can be performed with high accuracy, and the cover can be properly fixed.

DESCRIPTION OF THE EMBODIMENTS

Hereinafter, embodiments for carrying out the disclosure will be described with reference to the drawings. Further, in the following description, a direction in which a rotating shaft 40 of a rotor 30 extends is defined as an axis L direction, and in the axis L direction, a side in which the rotating shaft 40 protrudes from a case 20 is defined as one side L1, and a side opposite to the side in which the rotating shaft 40 protrudes from the case 20 is defined as the other side L2.

Apparatus with Damper

Figure 1:
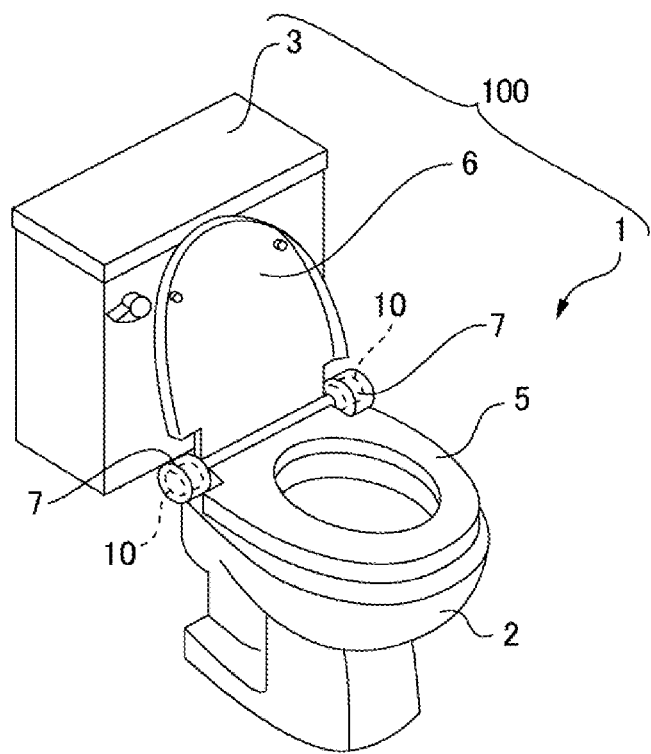
FIG. 1 is an explanatory diagram of a western type toilet unit including a western type toilet bowl equipped with a fluid damper device to which an embodiment of the disclosure is applied.

FIG. 1 is an explanatory diagram of a western type toilet unit 100 including a western type toilet bowl 1 equipped with a fluid damper device 10 to which an embodiment of the disclosure is applied. The western type toilet unit 100 illustrated in FIG. 1 includes the western type toilet bowl 1 (an apparatus with a damper) and a water tank 3. The western type toilet bowl 1 includes a toilet body 2 (apparatus body), a toilet seat 5 (opening and closing member) formed of a resin, a toilet lid 6 (opening and closing member) formed of a resin, a unit cover 7, and so on. The fluid damper device 10 for the toilet seat and the toilet lid is built in the unit cover 7, and each of the toilet seat 5 and the toilet lid 6 is connected to the toilet body 2 via the fluid damper device 10. Here, as the fluid damper device 10 connected to the toilet seat 5 and the fluid damper device 10 connected to the toilet lid 6, those having the same configuration can be used. In the following description, the fluid damper device 10 connected to the toilet seat 5 will be described.

Figure 2:
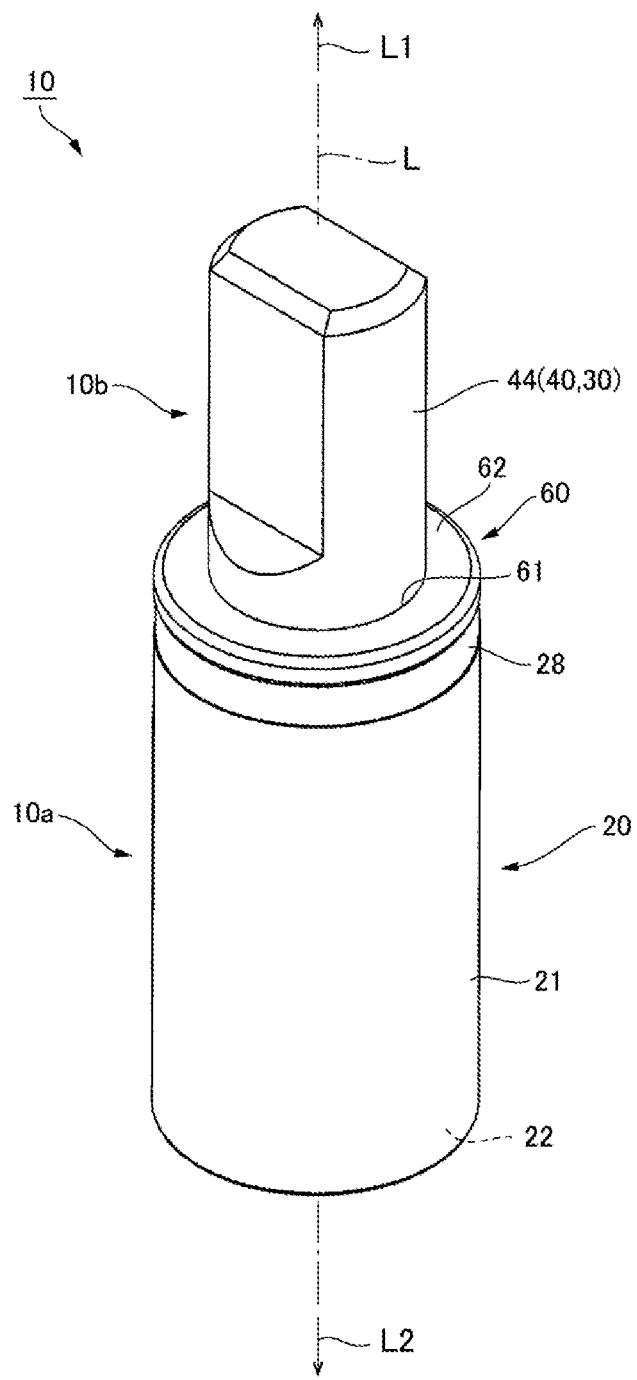
FIG. 2 is an external perspective view of the fluid damper device.

FIG. 2 is a perspective view of the fluid damper device 10 and is a perspective view when seen from one side L1. The fluid damper device 10 includes a cylindrical fluid damper device main body 10a extending in the axis L direction, and a connecting shaft 10b protruding from the fluid damper device main body 10a to one side L1. The connecting shaft 10b is connected to the toilet seat 5. Since opposing surfaces of a distal end portion of the connecting shaft 10b are flat surfaces, the toilet seat 5 is prevented from running idle with respect to the connecting shaft 10b. When the toilet seat 5 which is standing collapses over the toilet body 2, the fluid damper device 10 generates a force (rotational load) against it, thereby lowering a falling speed of the toilet seat 5.

Fluid Damper Device

Figure 3:
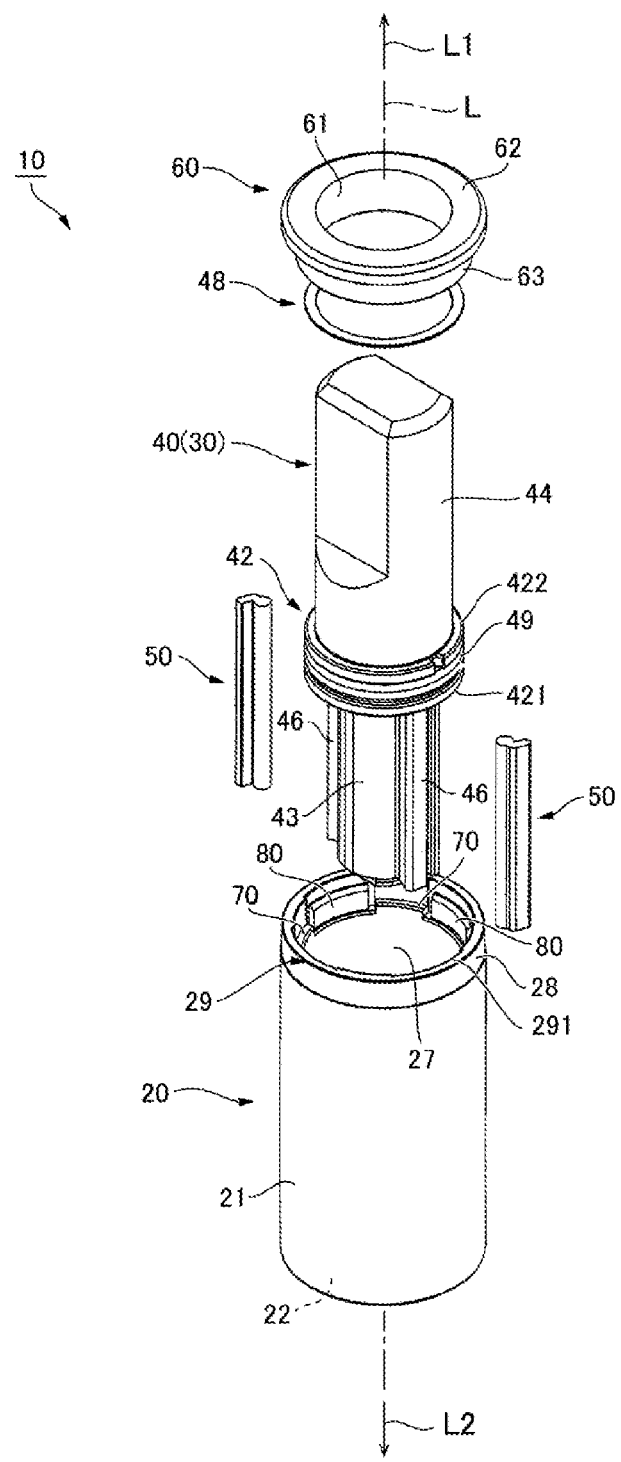
FIG. 3 is an exploded perspective view of the fluid damper device.
Figure 4:
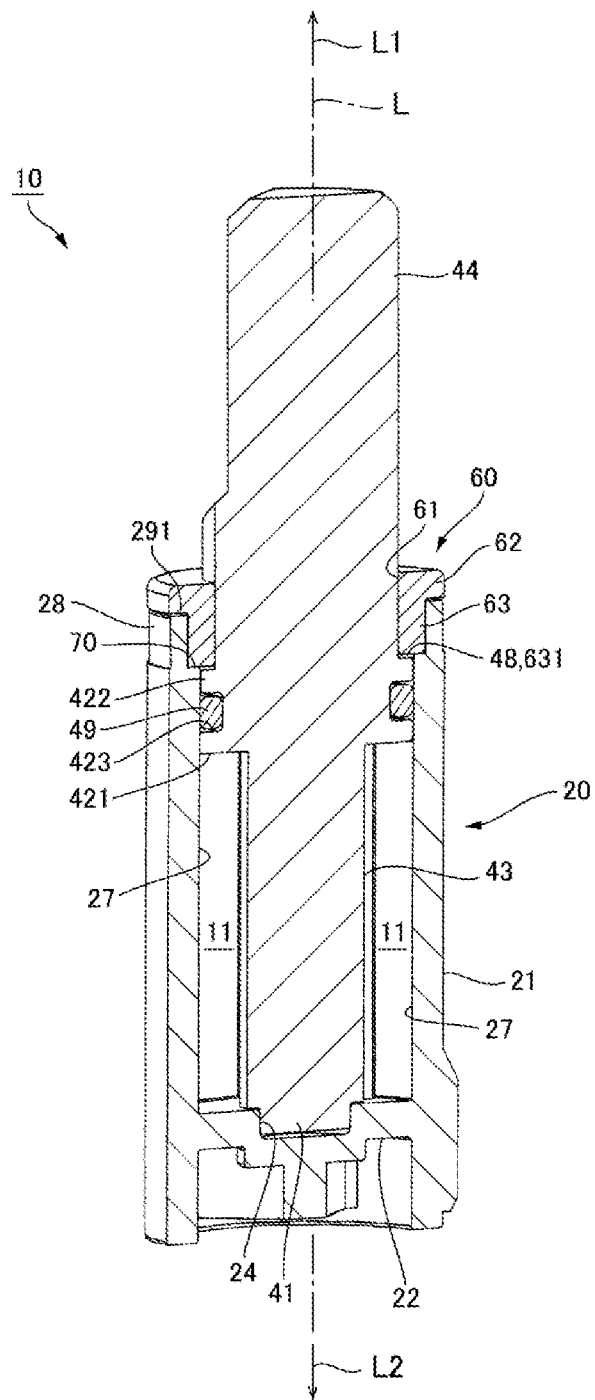
FIG. 4 is a cross-sectional perspective view of the fluid damper device taken along a plane including an axis.
Figure 5:
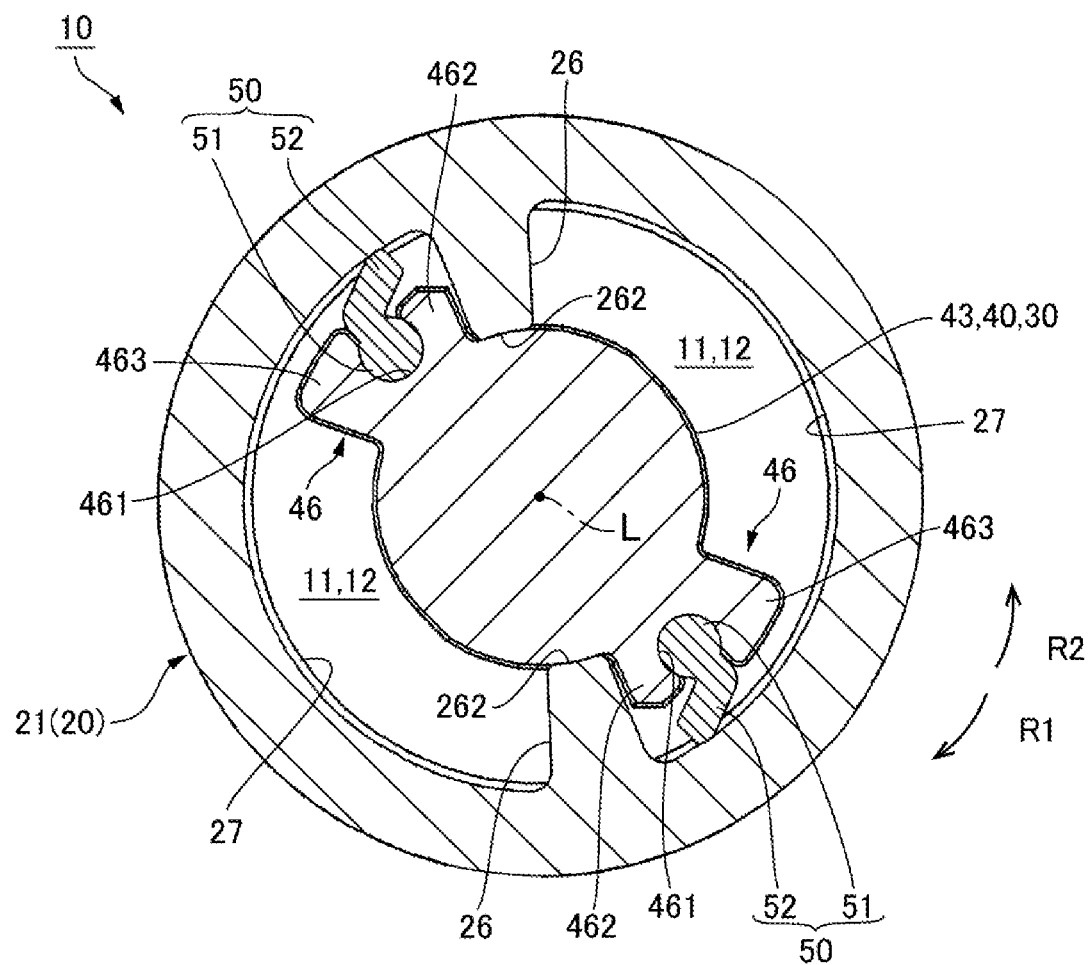
FIG. 5 is a cross-sectional view of the fluid damper device taken along a plane perpendicular to the axis.

FIG. 3 is an exploded perspective view of the fluid damper device. Further, FIG. 4 is a cross-sectional perspective view of the fluid damper device 10 taken along a plane including the axis L, and FIG. 5 is a cross-sectional view of the fluid damper device taken along a plane perpendicular to the axis L. The fluid damper device 10 has a bottomed cylindrical case 20, a rotor 30 rotatably held by the case 20, and an annular cover 60 which closes an opening portion 29 of the case 20. In the embodiment, the case 20 and the cover 60 are resin molded products.

The case 20 has a cylindrical body portion 21 which extends in the axis L direction and a bottom portion 22 which closes an end portion of the body portion 21 on the other side L2. The opening portion 29 is formed at an end portion of the body portion 21 on one side L1. As illustrated in FIG. 4, a circular concave portion 24 which is recessed toward the other side L2 is formed in a center of the bottom portion 22. A shaft portion 41 provided at a distal end of the rotating shaft 40 of the rotor 30 on the other side L2 is inserted into the concave portion 24. The shaft portion 41 is rotatably held by the concave portion 24.

As illustrated in FIG. 5, on an inner circumferential surface of the body portion 21, partitioning convex portions 26 protruding inward in a radial direction are formed at two positions which are shifted by 180 degrees in a circumferential direction. The partitioning convex portions 26 extend in the axis L direction, and end portions of the partitioning convex portions 26 on the other side L2 are connected to the bottom portion 22. A dimension (thickness) of the partitioning convex portions 26 in the circumferential direction becomes thinner from an outer side toward an inner side in the radial direction. The partitioning convex portions 26 partition a damper chamber 11 formed inside the body portion 21 in the circumferential direction.

The rotor 30 includes the rotating shaft 40, an end portion of which on the other side L2 is disposed inside the case 20, and valve bodies 50 held by the rotating shaft 40. The rotating shaft 40 is linear as a whole, and an annular flange portion 42 is formed at a position on the other side L2 of a center in the axis L direction. The flange portion 42 is fainted on an entire circumference of the rotating shaft 40. A first shaft portion 43 having a diameter smaller than that of the flange portion 42 is provided on the other side L2 of the flange portion 42, and a second shaft portion 44 having a diameter smaller than that of the flange portion 42 and larger than that of the first shaft portion 43 is provided on one side L1 of the flange portion 42. The shaft portion 41 inserted into the concave portion 24 of the case 20 protrudes from a center of a distal end surface of the first shaft portion 43. Mutually opposing flat surfaces are formed on a distal end of the second shaft portion 44.

The flange portion 42 includes a first flange portion 421 and a second flange portion 422 which are disposed with a predetermined interval in the axis L direction, and an annular circumferential groove 423 (refer to FIG. 4) is formed between the first flange portion 421 and the second flange portion 422. An O-ring 49 is installed in the circumferential groove 423. When the rotor 30 is assembled to the case 20, the O-ring 49 is in contact with a cylindrical inner circumferential surface 27 of the case 20 and is crushed. Therefore, a gap between the case 20 and the flange portion 42 is sealed, and the damper chamber 11 hermetically sealed from the outside is formed between the bottom portion 22 of the case 20 and the flange portion 42. The damper chamber 11 is filled with a fluid 12 (a viscous fluid) such as oil.

Then, the fluid damper device 10 is configured by inserting the cover 60 between the second shaft portion 44 of the rotating shaft 40 and the body portion 21 of the case 20 and fixing the cover 60 to the opening portion 29 of the case 20. At this time, an annular washer 48 is disposed between the cover 60 and the second flange portion 422 of the rotating shaft 40. In this state, the shaft portion 41 provided at the end portion of the rotating shaft 40 on the other side L2 is rotatably supported by the concave portion 24 formed in the bottom portion 22 of the case 20, and the second shaft portion 44 is rotatably supported inside a through-hole 61 formed in the cover 60. Further, a part of the second shaft portion 44 passes through the through-hole 61 of the cover 60 and protrudes to one side L1, and thus the connecting shaft 10b is configured.

A contact surface with which the washer 48 and the second flange portion 422 are in contact is a sliding surface which slides when the rotor 30 rotates. That is, in the rotor 30, a surface of the second flange portion 422 on one side L1 is a sliding surface on which the washer 48 slides. By forming the washer 48 of a metal material, abrasion of the sliding surface can be minimized. Further, a lubricant such as grease is applied to the sliding surface.

Damper Chamber

As illustrated in FIG. 5, the annular damper chamber 11 is provided between the body portion 21 and the first shaft portion 43. Inner circumferential side end surfaces 262 of the partitioning convex portions 26 protruding inward from the inner circumferential surface of the body portion 21 are in contact with an outer circumferential surface of the first shaft portion 43. Therefore, the damper chamber 11 is partitioned into two chambers having the same shape by two partitioning convex portions 26. On the outer circumferential surface of the first shaft portion 43, valve body holding portions 46 are formed at two positions separated by 180 degrees in the circumferential direction. The two valve body holding portions 46 have the same shape and protrude radially outward from the outer circumferential surface of the first shaft portion 43. Further, the valve body holding portions 46 extend to an end portion of the first shaft portion 43 on the other side L2, and an end portion on one side L1 is connected to the first flange portion 421.

The valve bodies 50 are held by the two valve body holding portions 46. The valve body holding portions 46 are formed so that widths thereof in the circumferential direction narrow radially inward from a radially outer side. Valve body holding grooves 461 which are recessed radially inward are formed in radially outer side end portions of the valve body holding portions 46. The valve body holding grooves 461 are formed between first convex portions 462 located on one side in the circumferential direction and second convex portions 463 located on the other side in the circumferential direction and extend linearly in the axis L direction. The valve body holding grooves 461 are formed in circular arc shapes in which inner circumferential surfaces are curved over an angular range exceeding about 180°.

The valve bodies 50 include base portions 51 which are held in the valve body holding grooves 461, and distal end portions 52 which protrude radially outward from the base portions 51. The distal end portions 52 of the valve bodies 50 protrude in a direction that is inclined with respect to the radial direction and are in contact with the cylindrical inner circumferential surface 27. In the embodiment, a protruding dimension of the first convex portions 462 toward the outside in the radial direction is smaller than that of the second convex portions 463, and the distal end portions 52 of the valve bodies 50 are inclined to cover outer circumferential sides of the first convex portions 462.

In the fluid damper device 10, during a closing operation in which the toilet seat 5 illustrated in FIG. 1 rotates from a standing posture to a resting posture, the rotor 30 (the rotating shaft 40) rotates in a first direction R1 (refer to FIG. 5) around the axis L. The first direction R1 is a direction in which the rotor 30 rotates toward a side on which the distal end portions 52 are located with respect to the base portions 51 of the valve bodies 50. In this case, in the valve bodies 50, the distal end portions 52 of the valve bodies 50 are pressed against the cylindrical inner circumferential surface 27 by a pressure from the fluid 12. Therefore, the fluid 12 cannot pass between the valve bodies 50 and the cylindrical inner circumferential surface 27, and a rotational load is applied to the rotor 30 (the rotation shaft 40). However, even in this case, since a small gap is left between the bottom portion 22 of the case 20 and the valve bodies 50, slight movement of the fluid is allowed. Therefore, although the rotational load is applied to the rotor 30, the rotor 30 is allowed to rotate in the first direction R1 at a low speed.

Further, during an opening operation in which the toilet seat 5 illustrated in FIG. 1 rotates from the resting posture to the standing posture, the rotor 30 (rotation shaft 40) rotates in a second direction R2 (refer to FIG. 5) around the axis L. The second direction R2 is a direction opposite to the first direction R1. In this case, since the distal end portions 52 of the valve bodies 50 are separated from the cylindrical inner circumferential surface 27 by the pressure from the fluid 12, the fluid 12 can pass between the valve bodies 50 and the cylindrical inner circumferential surface 27. Therefore, the rotational load of the rotor 30 is small.

Sealing Structure of Damper Chamber in Axis L Direction

End portions of the valve bodies 50 on one side L1 are in contact with the first flange portion 421. Thus, there is hardly any gap between the valve bodies 50 and the first flange portion 421. Therefore, the fluid 12 does not pass between the valve bodies 50 and the first flange portion 421. On the other hand, end portions of the valve bodies 50 on the other side L2 are located slightly on one side L1 from end surfaces of the valve body holding portions 46 on the other side L2. Accordingly, on the other side L2 with respect to the valve bodies 50, a slight gap is provided between the end portion of the valve bodies 50 on the other side L2 and the bottom portion 22 of the case 20. Therefore, the fluid 12 can pass slightly through the gap.

The rotating shaft 40 forms a surface in which an end surface of the first shaft portion 43 on the other side L2 and end surfaces of the valve body holding portions 46 on the other side L2 are continuous. Here, there may be a case in which a gap is present between the end surfaces of the first shaft portion 43 and the valve body holding portions 46 on the other side L2 and the bottom portion 22 of the case 20, and ribs (not illustrated) extending in the radial direction are formed on the end surfaces of the first shaft portion 43 and the valve body holding portions 46 on the other side L2. When the fluid damper device 10 is configured, such ribs are crushed to a state corresponding to the gap between the end surfaces of the first shaft portion 43 and the valve body holding portions 46 on the other side L2 and the bottom portion 22 of the case 20. Therefore, the fluid 12 does not pass between the end surfaces of the first shaft portion 43 and the valve body holding portions 46 on the other side L2 and the bottom portion 22 of the case 20.

Figure 6:
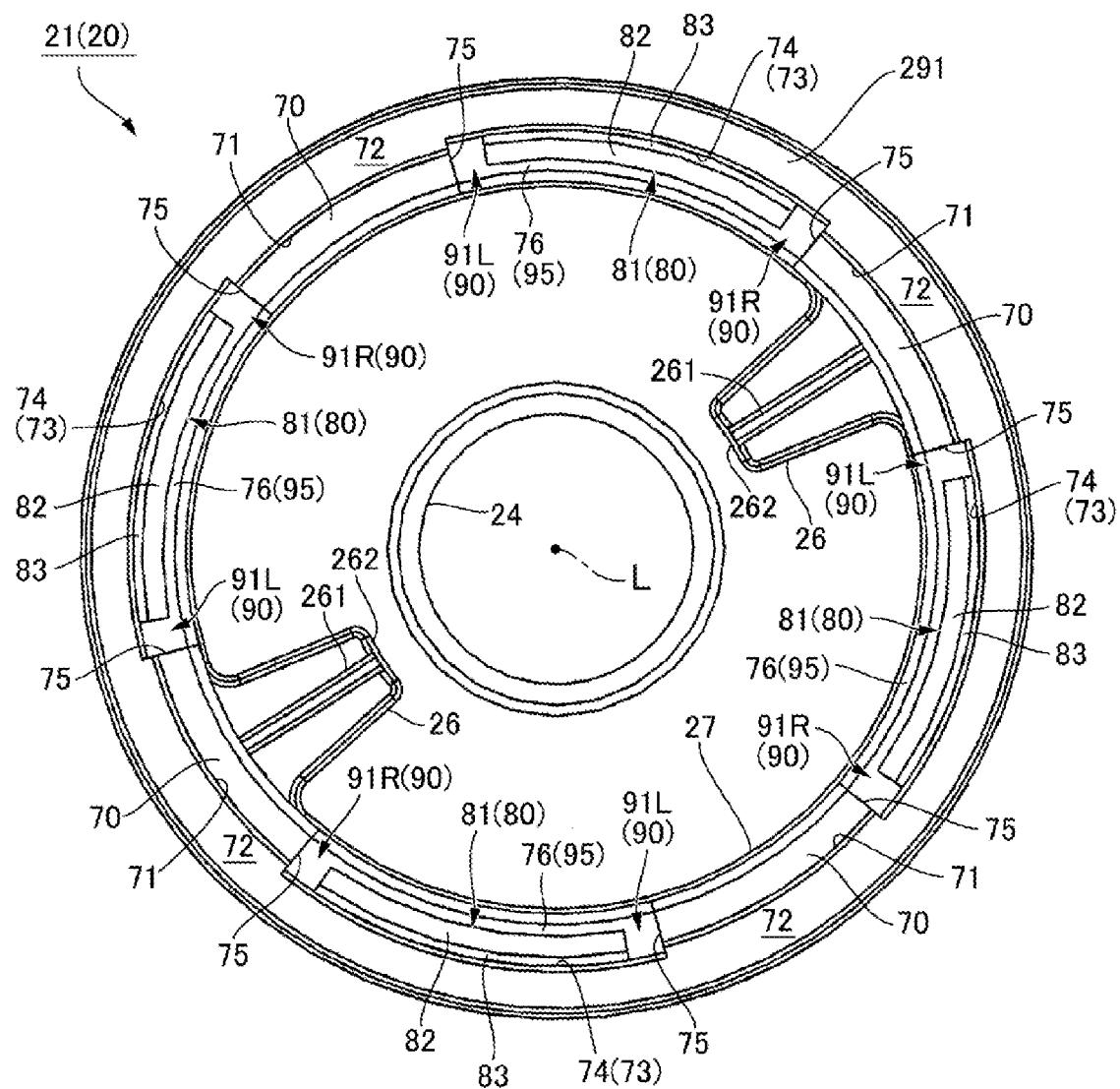
FIG. 6 is a front view of an opening portion of a case as seen from one side in an axis direction.
Figure 7:
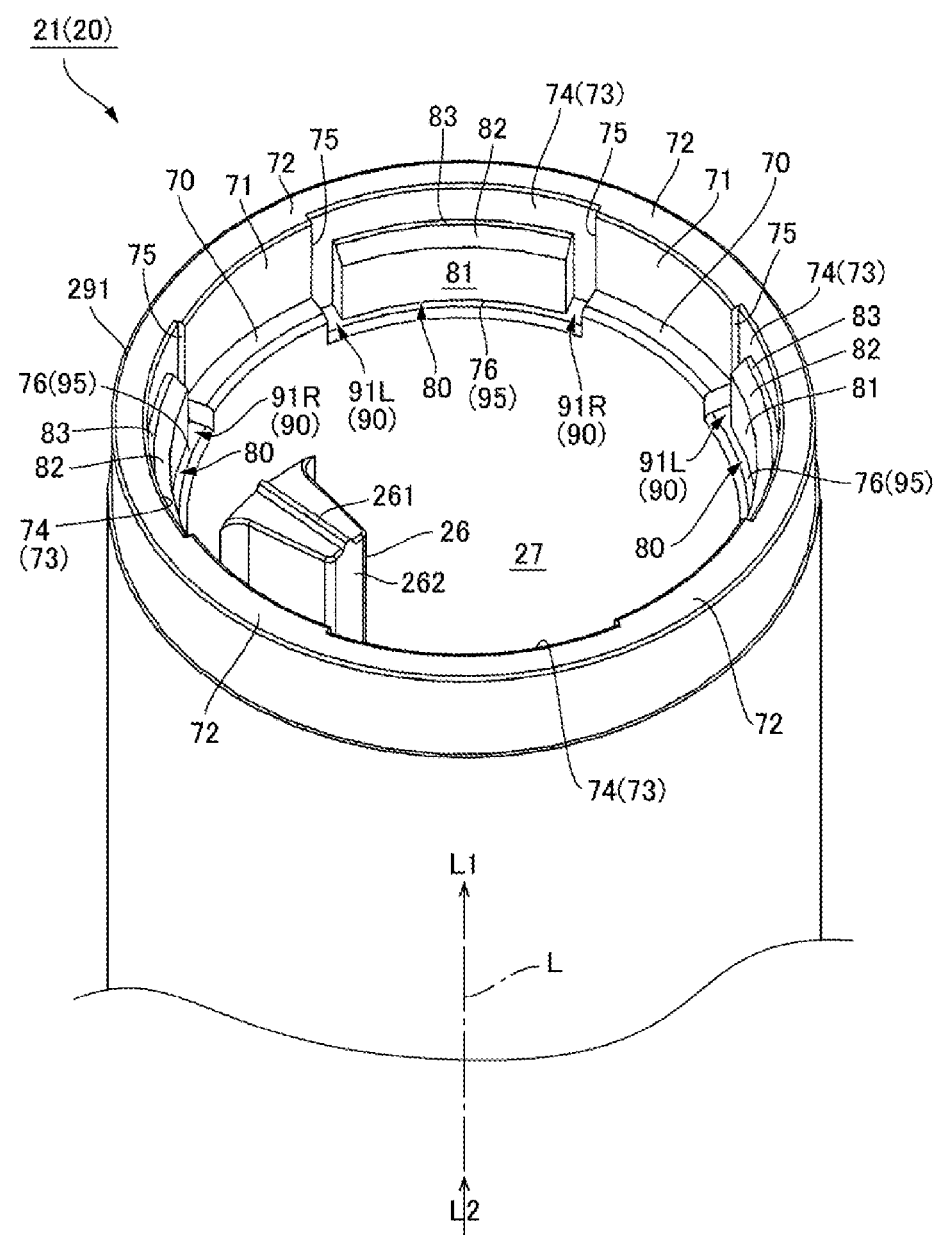
FIG. 7 is a perspective view of the opening portion of the case as seen from one side in the axis direction.

FIG. 6 is a front view of the opening portion 29 of the case 20 as seen from one side L1 in the axis L direction, and FIG. 7 is a perspective view of the opening portion 29 of the case 20 as seen from one side L1 in the axis L direction. As illustrated in FIGS. 6 and 7, ribs 261 extending in the radial direction are formed on end surfaces of the partitioning convex portions 26 on one side L1. The ribs 261 are connected to the cylindrical inner circumferential surface 27 of the body portion 21 and linearly extend from the cylindrical inner circumferential surface 27 to the inner circumferential side end surfaces 262 of the partitioning convex portions 26. When the fluid damper device 10 is configured, such ribs 261 are crushed to a state corresponding to the gap between the end surfaces of the partitioning convex portions 26 on one side L1 and the first flange portion 421 of the rotating shaft 40. Therefore, the fluid 12 does not pass between the end surfaces of the partitioning convex portions 26 on one side L1 and the first flange portion 421 of the rotating shaft 40.

Fixing Structure of Cover

As illustrated in FIGS. 3 and 4, the cover 60 has an annular shape as a whole, and the circular through-hole 61 for passing the second shaft portion 44 of the rotor 30 is formed at a center thereof. The cover 60 includes a collar-shaped large-diameter portion 62 formed at an end portion on one side L1 in the axis L direction, and a small-diameter portion 63 protruding from a center of the large-diameter portion 62 to the other side L2. An outer diameter of the small-diameter portion 63 is substantially constant, and an annular end surface 631 facing the other side L2 in the axis L direction is formed at a distal end of the small-diameter portion 63. The large-diameter portion 62 faces an opening end surface 291 provided at the end portion of the case 20 on one side L1 in the axis L direction and covers the opening end surface 291 from one side L1 in the axis L direction.

As illustrated in FIG. 4, in the case 20, a thin portion 28 is formed at an end portion of the body portion 21 on one side L1 in the axis L direction. The inner circumferential surface of the body portion 21 includes the cylindrical inner circumferential surface 27 on which the partitioning convex portions 26 are formed, and the thin portion 28 is formed on one side L1 of the cylindrical inner circumferential surface 27 in the axis L direction. Contact portions 70 facing one side L1 in the axis L direction are formed between the cylindrical inner circumferential surface 27 and the thin portion 28, and an inner circumferential surface of the thin portion 28 is connected to the cylindrical inner circumferential surface 27 via the contact portions 70. The cover 60 is positioned in the axis L direction by bringing the annular end surface 631 of the small-diameter portion 63 into contact with the contact portions 70. Further, as will be described later, in the cover 60, the small-diameter portion 63 and the thin portion 28 are welded at different positions from the contact portions 70 in the circumferential direction.

As illustrated in FIGS. 6 and 7, the contact portions 70 are formed on parts of the inner circumferential surface of the thin portion 28 in the circumferential direction. In the embodiment, the contact portions 70 are formed at four positions at equal angular intervals. The contact portions 70 extend in circular arc shapes within predetermined angular ranges in the circumferential direction. Inner circumferential edges of the contact portions 70 are chamfered into R shapes and are connected to the cylindrical inner circumferential surface 27. Further, outer circumferential edges of the contact portions 70 are connected to arc-shaped inner circumferential surfaces 71 which stand toward one side L1 in the axis L direction. The arc-shaped inner circumferential surfaces 71 are the inner circumferential surface of the thin portion 28, and are arc-shaped surfaces centering on a central axis (axis L) of the case 20. The cover 60 is positioned in a direction orthogonal to the axis L by the outer circumferential surface of the small-diameter portion 63 and the arc-shaped inner circumferential surfaces 71 being in contact with each other in the radial direction. The arc-shaped inner circumferential surfaces 71 are connected to the opening end surface 291 which is the end surface of the case 20 on one side L1 in the axis L direction. A portion of the opening end surface 291 connected to the arc-shaped inner circumferential surfaces 71 is a wide portion 72 having a wider radial width than other portions. The opening end surface 291 of the case 20 including the wide portion 72 is entirely covered from one side L1 in the axis L direction by the large-diameter portion 62 of the cover 60. In the embodiment, positioning of the cover 60 and the case 20 in the axis L direction is performed at portions at which the contact portions 70 and the small-diameter portion 63 are in contact with each other. Therefore, the opening end surface 291 of the case 20 and the large-diameter portion 62 are not in contact with each other in the axis L direction, but face each other with a gap therebetween.

The contact portions 70 are disposed at angular intervals of 90° with respect to the axis L which is the center of the cylindrical inner circumferential surface 27. Further, the contact portions 70 are formed at circumferential positions corresponding to the partitioning convex portions 26. As illustrated in FIG. 6, among the four contact portions 70, two contact portions 70 which are separated by 180 degrees are formed so that centers thereof in the circumferential direction coincide with centers of the partitioning convex portions 26 in the circumferential direction. The ribs 261 are formed at the centers of the partitioning convex portions 26 in the circumferential direction. Therefore, centers of the two contact portions 70 in the circumferential direction coincide with angular positions of the ribs 261. The positioning of the cover 60 in the axis L direction is performed at the angular positions of the ribs 261 by providing the contact portions 70 at the angular positions of the ribs 261. That is, positional accuracy of the cover 60 in the axis L direction is enhanced by the angular positions of the ribs 261. Accordingly, sealing accuracy of the damper chamber 11 is enhanced.

As illustrated in FIGS. 6 and 7, concave portions 73 in which regions between the adjacent contact portions 70 in the circumferential direction are recessed radially outward and toward the other side L2 in the axis L direction are formed in the inner circumferential surface of the thin portion 28. In the embodiment, the concave portions 73 are formed at four positions of the inner circumferential surface of the thin portion 28 at equal angular intervals. Inner circumferential surfaces of the concave portions 73 include arc-shaped inner circumferential surfaces 74 facing radially inward, pairs of side end surfaces 75 standing radially inward from both sides of the arc-shaped inner circumferential surfaces 74 in the circumferential direction, and arc-shaped stepped surfaces 76 connected to the arc-shaped inner circumferential surfaces 74 and end edges of the side end surfaces 75 on the other side L2 in the axis L direction. The concave portions 73 are recessed to positions on the other side L2 in the axis L direction from the contact portions 70. Therefore, the arc-shaped stepped surfaces 76 are located on the other side L2 in the axis L direction from the contact portions 70. The arc-shaped stepped surfaces 76 are flat surfaces facing one side L1 in the axis L direction and are located on the other side L2 in the axis L direction with respect to the contact portions 70.

A welding convex portion 80 is formed in each of the four concave portions 73. That is, the welding convex portions 80 are formed at four positions of the thin portion 28 at equal angular intervals, and the welding convex portions 80 are formed at circumferential positions different from those of the contact portions 70. The welding convex portions 80 have portions that are welded in contact with the small-diameter portion 63 and portions that are not welded to the small-diameter portion 63 when the small-diameter portion 63 of the cover 60 is inserted into the thin portion 28 and then ultrasonic welding is performed. That is, the welding convex portions 80 are not portions which are entirely welded to the small-diameter portion 63 but are portions in which parts of the welding convex portions 80 are welded to the small-diameter portion 63. The welding convex portions 80 protrude radially inward from the arc-shaped inner circumferential surfaces 74 and have a shape to stand from the arc-shaped stepped surfaces 76 of the concave portions 73 to one side L1 in the axis L direction. The welding convex portions 80 extend at a predetermined height in the axis L direction and one ends of the welding convex portions 80 in the axis L direction, the contact portions 70, and the other ends of the welding convex portions 80 in the axis L direction are arranged in the axis L direction in this order.

That is, the welding convex portions 80 are formed in ranges including positions of the contact portions 70 in the axis L direction. Inner circumferential surfaces of the welding convex portions 80 are arc-shaped inner circumferential surfaces 81 centering on the axis L, and these surfaces are located radially inward from the arc-shaped inner circumferential surfaces 74 of the contact portions 70. Radially inner portions of the welding convex portions 80 are portions (portions to be welded) which are melted and softened and are integrated with the small-diameter portion 63 when the small-diameter portion 63 of the cover 60 is fixed by ultrasonic welding.

Figure 8:
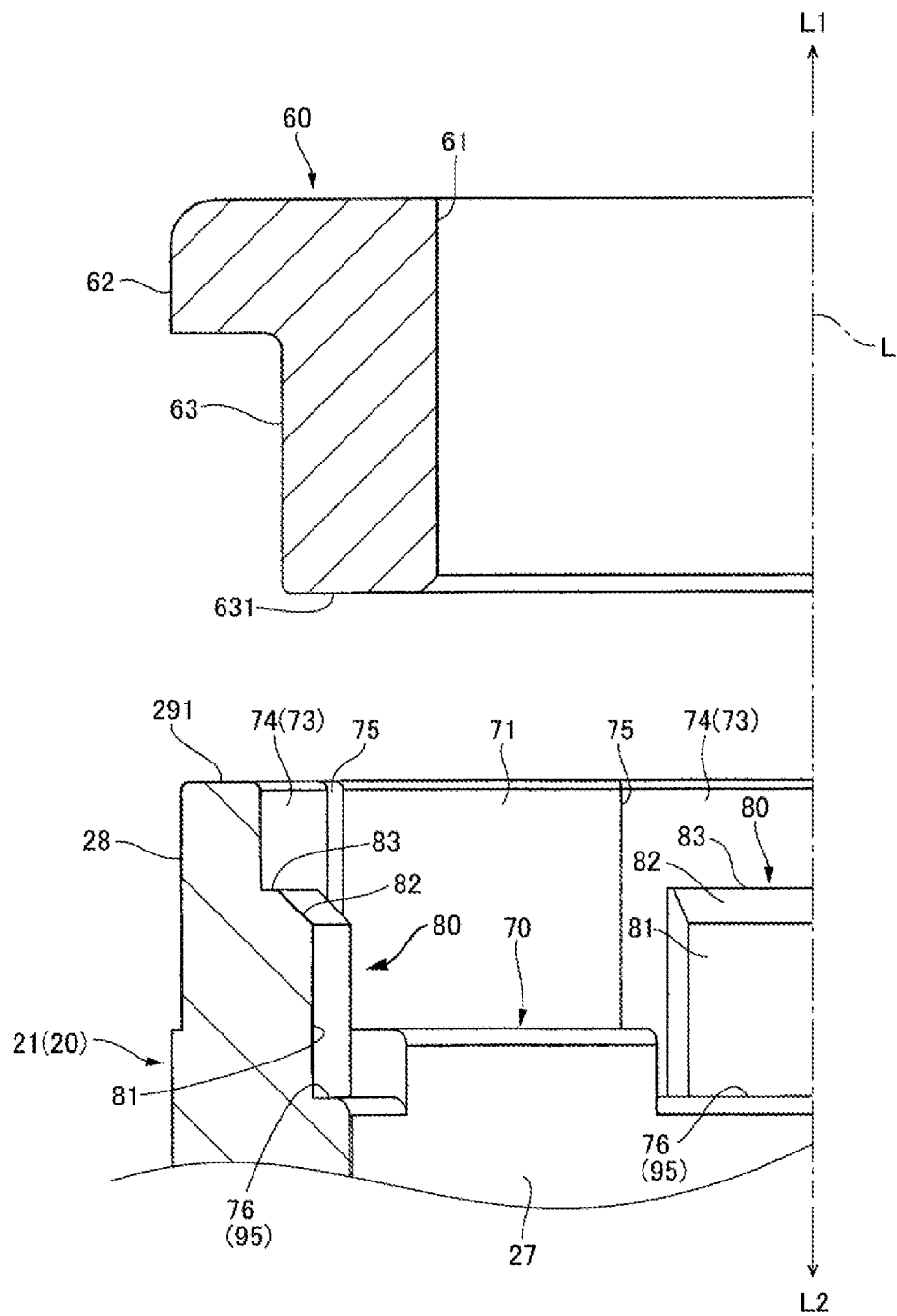
FIG. 8 is a partial cross-sectional view illustrating a state in which a case and a cover are separated.
Figure 9:
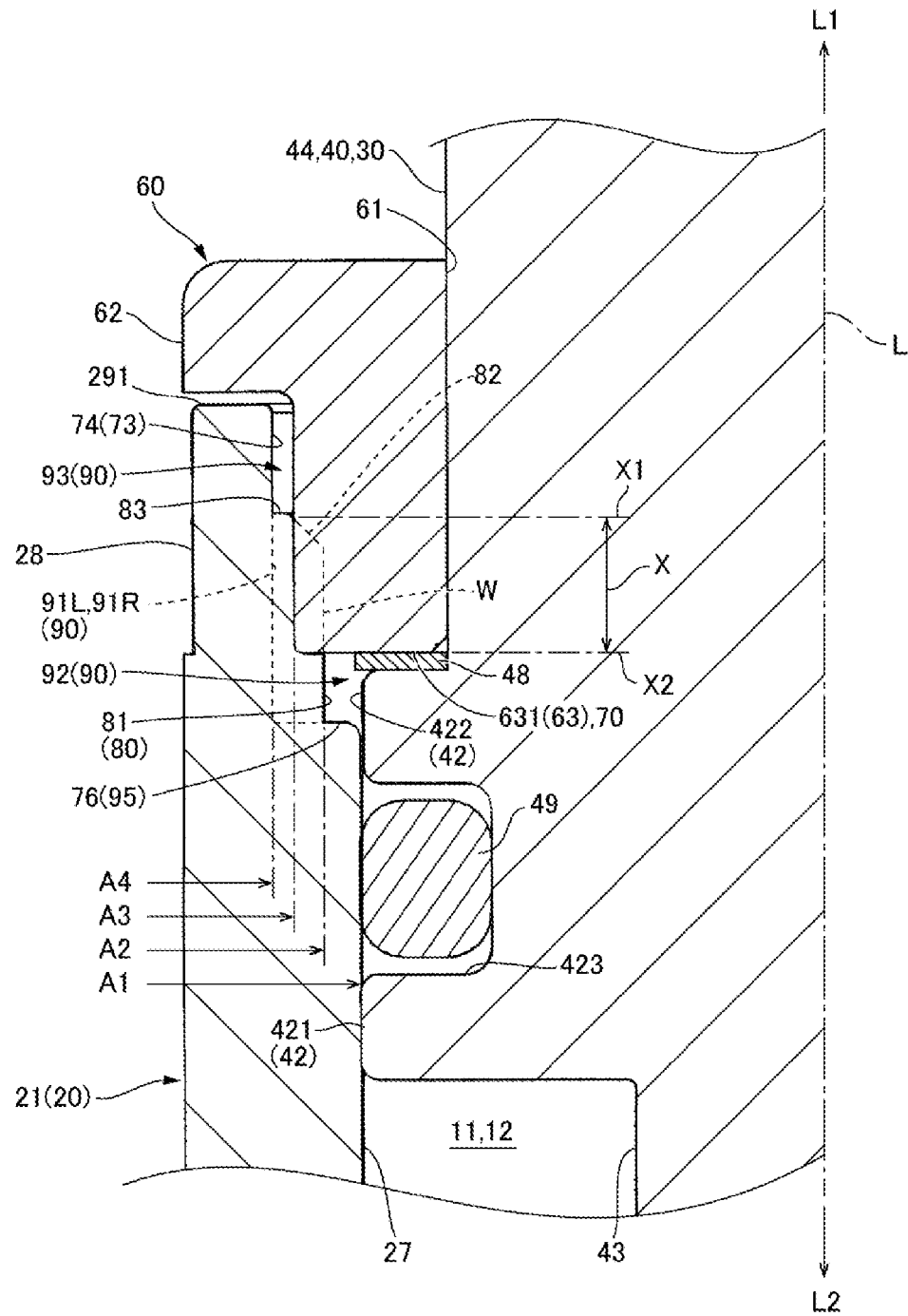
FIG. 9 is a partial cross-sectional view of a welding portion of the fluid damper device.

FIG. 8 is a partial cross-sectional view illustrating a state in which the case 20 and the cover 60 are separated. Further, FIG. 9 is a partial cross-sectional view of a welding portion of the fluid damper device 10. In FIG. 9, a welding margin portion of the welding convex portion 80 is indicated by W. In the embodiment, the distal end of the small-diameter portion 63 of the cover 60 is inserted into an inner circumferential side of the thin portion 28 to bring the welding convex portion 80 and the small-diameter portion 63 into contact with each other, then ultrasonic vibration is applied in a state in which a horn for ultrasonic welding (not illustrated) is brought into contact with the welding convex portion 80 at a corresponding angular position from the outside of the case 20 and the cover 60, and thus a contact place between the welding convex portion 80 and the small-diameter portion 63 is melted and softened. In this state, when the cover 60 is pressed toward the case 20 and thus the small-diameter portion 63 is pushed toward the other side L2 in the axis L direction, the cover 60 can be pushed into a position in which the annular end surface 631 of the small-diameter portion 63 is in contact with the contact portion 70. Therefore, the cover 60 is positioned in the axis L direction. Further, when the cover 60 is positioned in the axis L direction by the contact portion 70, the second flange portion 422 of the rotating shaft 40 is positioned in the axis L direction by an inner circumferential portion of the annular end surface 631 of the small-diameter portion 63 via the washer 48. That is, a pressing amount of the cover 60 to the case 20 is controlled by the contact portion 70. Further, a height of the damper chamber 11 in the axis L direction is controlled by the contact portion 70.

As illustrated in FIG. 9, the small-diameter portion 63 of the cover 60 and the welding convex portion 80 are welded in a predetermined range in the axis L direction. Hereinafter, the welding range in the axis L direction is indicated by a symbol X. Further, an end portion of the welding range X on one side L1 in the axis L direction is defined as one end portion X1, and an end portion of the welding range X on the other side L2 in the axis L direction is defined as the other end portion X2. As illustrated in FIG. 9, a height of the other end portion X2 of the welding range X is the same as that of the annular end surface 631 of the small-diameter portion 63 and is the same as that of the contact portion 70. The welding convex portion 80 extends from the other end portion X2 of the welding range X to the other side L2 in the axis L direction. That is, the welding convex portion 80 is formed in a range including a position of the other end portion X2 of the welding range X in the axis L direction.

Further, the welding convex portion 80 extends from one end portion X1 of the welding range X to one side L1 in the axis L direction. A tapered surface 82 connected to the arc-shaped inner circumferential surface 81 and an arc-shaped end surface 83 expanding radially outward from the tapered surface 82 are formed at one end portion of the welding convex portion 80 in the axis L direction. The tapered surface 82 is inclined in a direction expanding radially outward as it goes toward one side L1 in the axis L direction. As illustrated in FIG. 9, one end portion X1 of the welding range X is a midway position of the tapered surface 82 in the axis L direction. The arc-shaped end surface 83 is a flat surface facing the one side L1 in the axis L direction and is provided at a position which is one stage lower than the opening end surface 291 of the case 20 toward the other side L2 in the axis L direction. The arc-shaped end surface 83 is connected to a midway position of the arc-shaped inner circumferential surface 74 of the concave portion 73 in the axis L direction. That is, a stepped portion is formed by the arc-shaped end surface 83 and the arc-shaped inner circumferential surface 74 at the end portion of the welding convex portion 80 on the one side L1 in the axis L direction.

Outflow Preventing Portion and Outflow Restricting Portion

In the case 20 of the embodiment, an outflow preventing portion 90 for holding a molten resin (molten material) melted and softened by ultrasonic vibration is provided at a position adjacent to the welding convex portion 80. When the molten resin (molten material) flows out, the outflow preventing portion 90 serves as a welding burr sump for accommodating the molten resin (molten material). The outflow preventing portion 90 may hold the molten resin (molten material) therein or may remain as a space without the molten resin (molten material) flowing out. Further, in the case 20, an outflow restricting portion 95 which restricts the molten resin from flowing out to a side of the O-ring 49 for sealing the damper chamber 11 is provided on the other side L2 of the outflow preventing portion 90 in the axis L direction. Specifically, the arc-shaped stepped surface 76 of the concave portion 73 in which the welding convex portion 80 is formed serves as the outflow restricting portion 95. Since the arc-shaped stepped surface 76 (outflow restricting portion 95) is provided between the welding convex portion 80 and the O-ring 49, the molten resin (molten material) flowing out from the welding convex portion 80 is restricted from reaching the O-ring 49. Further, an R-shaped chamfered portion is provided on an inner circumferential edge of the arc-shaped stepped surface 76, and the outflow restricting portion 95 also includes the chamfered portion.

In the embodiment, as the outflow preventing portion 90, first outflow preventing portions 91L and 91R are provided at positions adjacent to the welding convex portion 80 in the circumferential direction. As illustrated in FIG. 7, the first outflow preventing portions 91L and 91R are groove-shaped gaps provided on both sides of the welding convex portion 80 in the circumferential direction. The first outflow preventing portions 91L and 91R are provided between the welding convex portion 80 and the side end surfaces 75 of the concave portion 73. The first outflow preventing portions 91L and 91R are continuously provided in the axis L direction in a range from the opening end surface 291 provided at the end portion of the case 20 on the one side L1 in the axis L direction to the arc-shaped stepped surface 76 of the concave portion 73.

Further, as illustrated in FIG. 9, a second outflow preventing portion 92 provided radially inward from a portion of the welding convex portion 80 on the other side L2 in the axis L direction, and a third outflow preventing portion 93 provided on one side L1 of the welding convex portion 80 in the axis L direction are formed as other outflow preventing portions 90. The arc-shaped inner circumferential surface 81 of the welding convex portion 80 is provided at a position retreating radially outward from the cylindrical inner circumferential surface 27 of the case 20. Therefore, on the other side L 2 in the axis L direction from the welding range X, the second outflow preventing portion 92 which is a radial gap is formed on an inner side of the welding convex portion 80 in the radial direction between the arc-shaped inner circumferential surface 81 and the flange portion 42 of the rotating shaft 40.

Both ends of the second outflow preventing portion 92 in the circumferential direction are connected to the first outflow preventing portions 91L and 91R described above, and the arc-shaped stepped surface 76 (outflow restricting portion 95) is provided on the other side L2 of the first outflow preventing portions 91L and 91R and the second outflow preventing portion 92 in the axis L direction. When the molten resin (melted material) melted and softened at the time of ultrasonic welding flows out to both sides of the welding convex portion 80 in the circumferential direction, it is held by the first outflow preventing portions 91L and 91R. Similarly, when the molten resin (molten material) melted and softened at the time of ultrasonic welding flows out radially inward from the welding convex portion 80 on the other side L2 of the small-diameter portion 63 of the cover 60 in the axis L direction, it is held by the second outflow preventing portion 92. The molten resin (molten material) held by the first outflow preventing portions 91L and 91R and the second outflow preventing portion 92 is held so as not to flow out to a position of the O-ring 49 by the arc-shaped stepped surface 76 (outflow restricting portion 95) provided on the other side of the first outflow preventing portions 91L and 91R and the second outflow preventing portion 92 in the axis L direction. Therefore, there is little possibility of the O-ring 49 being deformed by the molten resin (molten material).

The third outflow preventing portion 93 is a radial gap provided between the outer circumferential surface of the small-diameter portion 63 of the cover 60 and the arc-shaped inner circumferential surface 74 of the concave portion 73 of the case 20 above the arc-shaped end surface 83 provided on one side L1 of the welding convex portion 80 in the axis L direction. When the molten resin (molten material) melted and softened at the time of ultrasonic welding flows out to one side of the welding convex portion 80 in the axis L direction, it is held by the third outflow preventing portion 93. In this way, since a stepped portion is provided between the opening end surface 291 of the case 20 and the welding convex portion 80 to ensure the third outflow preventing portion 93, the molten resin (molten material) is prevented from flowing out from a gap between the opening end surface 291 of the case 20 and the large-diameter portion 62 of the cover 60, and it is possible to prevent the molten resin (molten material) from flowing out to the outside of the case 20 and the cover 60 and to prevent welding burrs from being formed.

The opening end surface 291 of the case 20 is covered from the one side L1 in the axis L direction by the large-diameter portion 62 of the cover 60. Further, the third outflow preventing portion 93 provided on the inner circumferential side of the opening end surface 291 and the first outflow preventing portions 91L and 91R provided at both sides thereof in the circumferential direction are covered from the one side L1 in the axis L direction by the large-diameter portion 62 of the cover 60. That is, the large-diameter portion 62 serves as a blind board covering the first outflow preventing portions 91L and 91R and the third outflow preventing portion 93. Further, as described above, the large-diameter portion 62 of the cover 60 is not in contact with the opening end surface 291 of the case 20, and a gap in which a small amount of the molten resin can flow out is formed between the opening end surface 291 of the case 20 and the large-diameter portion 62 of the cover 60.

Here, in FIG. 9, when a radial position of a sealed position (that is, a position in which the O-ring 49 is in contact with the cylindrical inner circumferential surface 27 of the case 20) by the O-ring 49 is indicated by a reference symbol A1, a radial position of the arc-shaped inner circumferential surface 81 of the welding convex portion 80 is indicated by A2, a radial position of the outer circumferential surface of the small-diameter portion 63 is indicated by A3, and a radial position of the arc-shaped inner circumferential surface 74 of the concave portion 73 is indicated by A4, the radial positions A1, A2, A3 and A4 are arranged radially outward from a radially inner side in this order. The first outflow preventing portions 91L and 91R are gaps which expand in a range of the radial positions A1 to A4 on the other side L2 in the axis L direction from the other end portion X2 of the welding range X and are gaps in a range of the radial positions A3 to A4 on one side in the axis L direction from the other end portion X2 of the welding range X. Further, the second outflow preventing portion 92 is a gap in a range of the radial positions A1 to A2, and the third outflow preventing portion 93 is a gap in a range of the radial positions A3 to A4. In the embodiment, the arc-shaped stepped surface 76 which is a flat surface serving as the outflow restricting portion 95 is formed within the range of the radial positions A1 to A2 in an angular range in which the second outflow preventing portion 92 is provided. Further, in an angular range in which the first outflow preventing portions 91L and 91R are provided, it is formed within the range of the radial positions A1 to A4.

Main Results of the Embodiment

As described above, in the fluid damper device 10 (fluid damper device) of the embodiment, the small-diameter portion 63 of the cover 60 fixed to the opening portion 29 of the case 20 and a contact portion 70 in contact therewith in the axis L direction are formed at a part of the inner circumferential surface of the thin portion 28 of the case 20 in the circumferential direction. Therefore, when the cover 60 is fixed by welding, since the welding portion and the contact portion 70 can be provided at different positions in the circumferential direction, there is little possibility of the contact portion 70 being deformed by welding. For example, although a welding height varies, when the position in the circumferential direction is shifted, it is possible to avoid deformation of the contact portion 70 due to the welding. Therefore, the positioning of the cover 60 in the axis L direction can be performed with high accuracy, and the cover 60 can be appropriately fixed. As a result, the dimensional accuracy of the damper chamber 11 in the axis L direction can be improved, and variations in damper performance can be minimized.

In the embodiment, the partitioning convex portion 26 for partitioning the damper chamber 11 in the circumferential direction is formed on the inner circumferential surface of the case 20, and the contact portion 70 is formed at a circumferential position corresponding to the partitioning convex portion 26. Therefore, the positioning of the cover 60 in the axis L direction can be accurately performed at the position of the partitioning convex portion 26. Particularly, in the embodiment, the contact portion 70 is formed in a range including an angular position of the rib 261 formed on the end surface of the partitioning convex portion 26 on one side in the axis L direction, and the rib 261 is formed at a center of the contact portion 70 in the circumferential direction. Accordingly, the positioning of the cover 60 in the axis L direction can be accurately performed at the position of the rib 261 which enhances sealing accuracy of the damper chamber 11. Therefore, the sealing accuracy of the damper chamber 11 can be improved.

In the embodiment, the contact portion 70 is formed at four positions at equal angular intervals with respect to the axis L which is the center of the case 20 in the radial direction, and among the four positions, two positions disposed on an opposite side in the radial direction are formed in a range including the angular position of the rib 261 of the partitioning convex portion 26. That is, since the contact portions 70 are uniformly formed in the circumferential direction, the positioning of the cover 60 in the axis L direction can be performed with high accuracy, and inclination of the cover 60 can be minimized. Further, since the case 20 and the cover 60 can be welded at a position in which the contact portions 70 are not provided, the welding portions can be equally provided in the circumferential direction. Therefore, the welding portions can be provided in a well-balanced manner in the circumferential direction.

Further, the contact portions 70 and the welding convex portions 80 can be respectively provided not at four positions, but at three positions or two positions. Also, it is possible to be provided at five positions or more. In any case, it is desirable to provide them at equal angular intervals, but they may be disposed at positions other than equal angular intervals. For example, in the case that two positions are provided, they may be on opposing sides with respect to the center of the case 20 in the radial direction and may deviate at a predetermined angle from two positions of the case on a straight line extending in the radial direction (that is, two positions separated by 180°). Further, in the case that three positions are provided, two of the three positions and the remaining one may be disposed on the opposing sides with respect to the center of the case 20 in the radial direction. For example, the contact portion 70 can be disposed at three positions which are apexes positions of an isosceles triangle. Further, in the case that four positions are provided, when it is assumed that a first straight line and a second straight line extend in the radial direction of the case 20 and intersect each other, they may be disposed at two positions on opposing sides with respect to the center of the case 20 in the radial direction on the first straight line and at two positions on opposing sides with respect to the center of the case 20 in the radial direction on the second straight line. In this case, the two positions on the first straight line overlap the ribs 261. Further, the contact portions 70 and the welding convex portions 80 are provided at different positions in the circumferential direction.

The cover 60 of the embodiment includes the small-diameter portion 63 which is inserted into the end portion (thin portion 28) of the case 20 and the large-diameter portion 62 of which a diameter is larger than that of the small-diameter portion 63, the small-diameter portion 63 is inserted into the case 20 and is positioned in a direction orthogonal to the axis L direction by the arc-shaped inner circumferential surface 71 formed at a position different from that of the welding convex portion 80 in the circumferential direction. Therefore, the cover 60 and the case 20 can be coaxially positioned at positions different from that of the welding portion in the circumferential direction. Furthermore, the large-diameter portion 62 of the cover 60 covers the opening end surface 291 of the case 20, the first outflow preventing portions 91L and 91R and the third outflow preventing portion 93 formed on the inner circumferential side thereof from one side in the axis L direction. Therefore, since the molten resin flowing out from the first outflow preventing portions 91L and 91R and the third outflow preventing portion 93 is not directly seen from the outside, an exterior is good. Also, even though a small amount of the molten resin flows out from the first outflow preventing portions 91L and 91R and the third outflow preventing portion 93 and thus the welding burrs are formed, since the welding burrs are covered by the large-diameter portion 62 and are not directly seen, there is little possibility of the process of removing the welding burrs being added. In addition, since the large-diameter portion 62 is not in contact with the opening end surface 291, there is little possibility of a situation such as the cover 60 being pushed up by the molten resin which has flowed out occurring. Therefore, there is little possibility of the positional accuracy of the cover 60 in the axis L direction being deteriorated.

In the embodiment, on the inner circumferential surface of the case 20, the welding convex portion 80 welded to the cover 60 is formed at a position different from that of the contact portion 70 in the circumferential direction, and the welding convex portion 80 is formed in a range including a position of the contact portion 70 in the axis L direction. When the welding convex portion 80 and the contact portion 70 are formed at different positions in the circumferential direction, even though the welding height is in the range including the position (height in the axis L direction) of the contact portion 70 in the axis L direction, there is little possibility of the contact portion 70 being deformed. Therefore, the positioning of the cover 60 in the axis L direction with respect to the case 20 can be performed with high accuracy. Further, as compared with a case in which the welding convex portion 80 and the contact portion 70 are provided to be dislocated in the axis L direction, a size of the fluid damper device 10 in the axis L direction can be reduced.

In the embodiment, the welding convex portion 80 has a shape having the arc-shaped inner circumferential surface 81 centering on the axis L which is a rotation center of the rotor 30. Therefore, the small-diameter portion 63 of the cover 60 and the welding convex portion 80 can be uniformly brought into contact with each other in the circumferential direction and can be welded evenly in the circumferential direction.

In the embodiment, the outflow preventing portion 90 capable of holding the molten resin flowing out from a welding range is provided at a position which is adjacent to the welding convex portion 80 and also located radially inward from the inner circumferential surface of the case 20. Specifically, the first outflow preventing portions 91L and 91R are provided at positions adjacent to the welding convex portion 80 in the circumferential direction. Further, the second outflow preventing portion 92 is provided at a position on the other side L2 in the axis L direction from the welding range X and also located radially inward from the arc-shaped inner circumferential surface 81 of the welding convex portion 80. Furthermore, the third outflow preventing portion 93 is provided on one side in the axis L direction from the welding range X. Therefore, it is possible to hold the molten resin flowing out from the welding range, and there is little possibility of the molten resin flowing out from the case 20 and the cover 60 and of the welding burrs being formed. Accordingly, there is little possibility of the process of removing the welding burrs being added.

Further, in the embodiment, the outflow restricting portion 95 is provided on the other side L2 of the outflow preventing portion 90 in the axis L direction. For example, the arc-shaped stepped surface 76 serving as the outflow restricting portion 95 is provided on the other side L2 of the first outflow preventing portions 91L and 91R and the second outflow preventing portion 92 in the axis L direction. The outflow restricting portion 95 (arc-shaped stepped surface 76) is provided on one side L1 in the axis L direction from the O-ring 49. Therefore, it is possible to reduce the possibility of the molten material reaches the O-ring 49 and the sealing property of the damper chamber 11 being deteriorated.

What is claimed is:

1. A fluid damper device, comprising:
   a case, in a bottomed cylindrical shape and configured to be open on one side in an axis direction;
   a rotor, having a rotating shaft and a valve body, and the rotor being inserted into a damper chamber formed in the case;
   a fluid, filled in the damper chamber;
   a cover, having a through-hole through which the rotor passes, and the cover is fixed into an opening portion of the case; and
   a sealing member, configured to seal a gap between an outer circumferential surface of the rotor and an inner circumferential surface of the case,
   wherein contact portions which are in contact with the cover in the axis direction are formed in parts of an inner circumferential surface of the case in a circumferential direction;
   wherein
   a welding convex portion which is welded to the cover is formed on an inner circumferential surface of the case at a different position from the contact portions in the circumferential direction,
   the welding convex portion extends in the axis direction, and
   one end of the welding convex portion in the axis direction, the contact portions, and the other end of the welding convex portion in the axis direction are arranged in the axis direction in this order.

2. The fluid damper device according to claim 1, wherein partitioning convex portions configured to partition the damper chamber in the circumferential direction are formed on the inner circumferential surface of the case, and
   the contact portions are formed at circumferential positions corresponding to the partitioning convex portions.

3. The fluid damper device according to claim 2, wherein ribs configured to extend in radial directions are formed on end surfaces of the partitioning convex portions on one side in the axis direction, and
   the contact portions are formed in ranges including angular position of the ribs.

4. The fluid damper device according to claim 1, wherein the contact portions are formed at two opposing positions with respect to a center of the case in a radial direction.

5. The fluid damper device according to claim 4, wherein the contact portions are formed at the two opposing positions with respect to the center of the case in the radial direction on a straight line extending in the radial direction of the case.

6. The fluid damper device according to claim 1, wherein the contact portions are formed at three positions separated in the circumferential direction, and
   two of the three positions are disposed on a side opposite to remaining one of the three positions with respect to a center of the case in a radial direction.

7. The fluid damper device according to claim 6, wherein the contact portions are formed at three positions spaced at equal angular intervals with respect to the center of the case in the radial direction.

8. The fluid damper device according to claim 3, wherein the contact portions are formed at four positions separated in the circumferential direction,
   two of the four positions are two positions which are located on opposing sides with respect to a center of the case in the radial direction on a first straight line extending in the radial direction of the case and which overlaps the rib in the axis direction, and
   the remaining two of the four positions are two positions located on opposing sides with respect to the center of the case in the radial direction on a second straight line extending in the radial direction of the case and intersecting the first straight line.

9. The fluid damper device according to claim 8, wherein the contact portions are formed at four positions spaced at equal angular intervals with respect to the center of the case in the radial direction.

10. The fluid damper device according to claim 1, wherein an inner circumferential surface of the welding convex portion has an arc shape centering on a rotation center of the rotor.

11. The fluid damper device according to claim 1, wherein the cover has a small-diameter portion inserted into the case,
    an arc-shaped inner circumferential surface centering on a rotation center of the rotor is provided on the case at a different position from the welding convex portion, and
    the small-diameter portion is positioned by the arc-shaped inner circumferential surface in a direction orthogonal to the axis direction.

12. The fluid damper device according to claim 1, wherein an outflow preventing portion is provided in at least a part of a position adjacent to the welding convex portion to be located radially inward from the inner circumferential surface of the case.

13. The fluid damper device according to claim 12, wherein
    the outflow preventing portion is provided at a position adjacent to at least the welding convex portion in the circumferential direction.

14. The fluid damper device according to claim 12, wherein
    the case and the cover are welded in a predetermined range in the axis direction, and
    an outflow restricting portion located on the other side of the outflow preventing portion in the axis direction is provided on the other side in the axial direction from the predetermined range.

15. The fluid damper device according to claim 14, wherein
    the outflow preventing portion is provided at a position adjacent to the welding convex portion in the circumferential direction to continue from an end portion of the case on one side in the axis direction to the outflow restricting portion.

16. The fluid damper device according to claim 14, wherein
    the outflow preventing portion is provided on the other side of the predetermined range in the axis direction to be located radially inward from the inner circumferential surface of the welding convex portion.

17. The fluid damper device according to claim 14, wherein
the outflow restricting portion is provided on one side in the axis direction from the sealing member.

18. The fluid damper device according to claim 14, wherein
the outflow preventing portion is provided on one side of the predetermined range in the axis direction.

19. A fluid damper device, comprising:
a case, in a bottomed cylindrical shape and configured to be open on one side in an axis direction;
a rotor, having a rotating shaft and a valve body, and the rotor being inserted into a damper chamber formed in the case;
a fluid, filled in the damper chamber;
a cover, having a through-hole through which the rotor passes, and the cover is fixed into an opening portion of the case; and
a sealing member, configured to seal a gap between an outer circumferential surface of the rotor and an inner circumferential surface of the case,
wherein contact portions which are in contact with the cover in the axis direction are formed in parts of an inner circumferential surface of the case in a circumferential direction;
wherein
a welding convex portion which is welded to the cover is formed on a part of the inner circumferential surface of the case in the circumferential direction, and the welding convex portion and the cover are welded in a predetermined range in the axis direction, and
an outflow preventing portion is provided on one side in the axis direction from the predetermined range to be located radially inward from the inner circumferential surface of the case.

20. The fluid damper device according to claim 19, wherein
the cover comprises a small-diameter portion which is inserted into the case and welded to the welding convex portion and a large-diameter portion of which a diameter is larger than that of the small-diameter portion, and
the outflow preventing portion is covered by the large-diameter portion from one side in the axis direction.

21. The fluid damper device according to claim 20, wherein
an arc-shaped inner circumferential surface centering on a rotation center of the rotor is provided on the case at a different position from the welding convex portion in the circumferential direction, and
the small-diameter portion is positioned by the arc-shaped inner circumferential surface in a direction orthogonal to the axis direction.

22. The fluid damper device according to claim 19, wherein
the case comprises a stepped portion formed on one side of the welding convex portion in the axis direction.

23. The fluid damper device according to claim 22, wherein
the welding convex portion comprises a tapered surface connected to an inner circumferential edge of the stepped portion, and
the tapered surface is inclined in a direction expanding radially outward as it goes toward one side in the axis direction.

24. An apparatus with a damper comprising:
a fluid damper device, comprising:
a case, in a bottomed cylindrical shape and configured to be open on one side in an axis direction;
a rotor, having a rotating shaft and a valve body, and the rotor being inserted into a damper chamber formed in the case;
a fluid, filled in the damper chamber;
a cover, having a through-hole through which the rotor passes, and the cover is fixed into an opening portion of the case; and
a sealing member, configured to seal a gap between an outer circumferential surface of the rotor and an inner circumferential surface of the case,
wherein contact portions which are in contact with the cover in the axis direction are formed in parts of an inner circumferential surface of the case in a circumferential direction;
wherein
an opening and closing member configured to rotate and move with respect to an apparatus body is installed on the rotating shaft.

25. The apparatus according to claim 24, wherein the opening and closing member is a toilet seat of a western type toilet bowl.

* * * * *